United States Patent
Pomish (10) Patent No.: US 11,377,022 B2
(45) Date of Patent: Jul. 5, 2022

(54) ADAPTIVE HEADLIGHTS

(71) Applicant: Toyota Motor Engineering & Manufacturing North America, Inc., Plano, TX (US)

(72) Inventor: Ethan Pomish, Livonia, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/685,676

(22) Filed: Nov. 15, 2019

(65) Prior Publication Data

US 2021/0146823 A1 May 20, 2021

(51) Int. Cl.
*B60Q 1/14* (2006.01)
*B60K 35/00* (2006.01)
*B60Q 1/30* (2006.01)

(52) U.S. Cl.
CPC ............ *B60Q 1/1415* (2013.01); *B60K 35/00* (2013.01); *B60Q 1/30* (2013.01); *B60K 2370/1529* (2019.05); *B60K 2370/167* (2019.05); *B60K 2370/349* (2019.05); *B60K 2370/52* (2019.05); *B60Q 2300/054* (2013.01); *B60Q 2300/312* (2013.01); *B60Q 2300/42* (2013.01)

(58) Field of Classification Search
CPC .. B60Q 1/1415; B60Q 1/30; B60Q 2300/054; B60Q 2300/312; B60Q 2300/42; B60K 35/00; B60K 2370/1529; B60K 2370/167; B60K 2370/349; B60K 2370/52
See application file for complete search history.

(56) References Cited

U.S. PATENT DOCUMENTS

| | | | |
|---|---|---|---|
| 6,254,259 B1 | 7/2001 | Kobayashi | |
| 6,456,206 B1 | 9/2002 | Rocca et al. | |
| 6,507,286 B2 | 1/2003 | Weindorf et al. | |
| 6,883,947 B1 * | 4/2005 | Sarabia | B60Q 1/30 362/540 |
| 7,134,707 B2 | 11/2006 | Isaac | |
| 7,157,856 B2 | 1/2007 | Chon et al. | |
| 7,241,034 B2 | 7/2007 | Smith et al. | |
| 8,738,236 B2 | 5/2014 | Moizard et al. | |
| 9,381,851 B2 | 7/2016 | Niemz | |
| 9,610,890 B2 | 4/2017 | Hoffmann | |
| 9,677,736 B2 | 6/2017 | Ravier et al. | |
| 9,969,319 B2 | 5/2018 | George et al. | |
| 10,124,716 B1 * | 11/2018 | Gauthier | B60Q 1/143 |
| 2004/0174255 A1 | 9/2004 | Banco | |
| 2007/0106475 A1 * | 5/2007 | Kondoh | G06V 20/58 340/436 |

(Continued)

*Primary Examiner* — Henry Luong
(74) *Attorney, Agent, or Firm* — Snell & Wilmer LLP (57) ABSTRACT

A system for adaptive lights for use in a vehicle includes a headlight configured to generate light to be at least partially directed away from the vehicle to illuminate a portion of an environment of the vehicle. The system further includes a sensor configured to detect data corresponding to an environmental condition in the environment of the vehicle. The system further includes an electronic control unit (ECU) coupled to the headlight and the sensor and configured to determine the environmental condition based on the detected data and to adjust an intensity and an orientation of the light generated by the headlight based on the environmental condition.

17 Claims, 6 Drawing Sheets

(56) References Cited

U.S. PATENT DOCUMENTS

| | | | |
|---|---|---|---|
| 2009/0010494 A1* | 1/2009 | Bechtel | B60R 1/00 |
| | | | 382/104 |
| 2013/0124037 A1 | 5/2013 | Goh et al. | |
| 2014/0049973 A1 | 2/2014 | Adachi et al. | |
| 2015/0151669 A1* | 6/2015 | Meisner | G06K 9/2027 |
| | | | 701/49 |
| 2016/0068097 A1* | 3/2016 | Langkabel | B60Q 1/085 |
| | | | 362/464 |
| 2017/0345299 A1* | 11/2017 | Gupta | G08G 1/163 |
| 2018/0170254 A1* | 6/2018 | Mioc | B60Q 3/20 |
| 2018/0186279 A1* | 7/2018 | Chen | F21S 41/141 |
| 2019/0031086 A1 | 1/2019 | Gutjahr et al. | |
| 2020/0262333 A1* | 8/2020 | Lacaze | B60Q 1/143 |

\* cited by examiner

ADAPTIVE HEADLIGHTS

BACKGROUND

1. Field

The present disclosure relates to systems and methods for improving vehicle lighting in various environmental conditions and, more particularly, for adaptive control of vehicle light sources in the various environmental conditions.

2. Description of the Related Art

Lights are and have been an integral component of vehicles for some time. Vehicle lights include headlights to illuminate an area around the vehicle in dark conditions along with taillights to inform following vehicles of the presence of the present vehicle. Vehicles may further include a number of cabin lights including central cabin lights to illuminate some or all of the vehicle cabin as well as backlights to illuminate specific vehicle features (such as instrument panels).

Conventional vehicle lights are operated by drivers or passengers using input devices (such as knobs, dials, or buttons). Drivers typically use these input devices to select which lights to turn on, when to turn them on, and a desired intensity of such lights. Such activities may undesirably take attention from a vehicle driver.

Some adaptive headlights have been recently implanted in some vehicles. This adaptive technology may automatically turn on vehicle headlights in dark conditions and turn off the vehicle headlights in light conditions. However, this technology has only been applied to headlights and not to other vehicle lights. Additionally, other control of headlights may be desirable beyond simply turning on and off the headlights.

Thus, there is a need in the art for improved adaptive vehicle light control.

SUMMARY

Described herein is a system for adaptive lights for use in a vehicle. The system includes a headlight configured to generate light to be at least partially directed away from the vehicle to illuminate a portion of an environment of the vehicle. The system further includes a sensor configured to detect data corresponding to an environmental condition in the environment of the vehicle. The system further includes an electronic control unit (ECU) coupled to the headlight and the sensor and configured to determine the environmental condition based on the detected data and to adjust an intensity and an orientation of the light generated by the headlight based on the environmental condition.

Also disclosed is a system for adaptive lights for use in a vehicle. The system includes a headlight configured to generate light to be at least partially directed away from the vehicle to illuminate a portion of an environment of the vehicle. The system also includes a network access device configured to receive information corresponding to an environmental condition in the environment of the vehicle. The system also includes an electronic control unit (ECU) coupled to the headlight and the network access device and configured to adjust an intensity and an orientation of the light generated by the headlight based on the environmental condition.

Also disclosed is a method for adaptive lights for use in a vehicle. The method includes generating, by a headlight, light to be at least partially directed away from the vehicle to illuminate a portion of an environment of the vehicle. The method further includes detecting, by a sensor, data corresponding to an environmental condition in the environment of the vehicle. The method further includes determining, by an electronic control unit (ECU), the environmental condition based on the detected data. The method further includes adjusting, by the ECU, an intensity and an orientation of the light generated by the headlight based on the environmental condition.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing improved adaptive lights in a vehicle. These systems provide various benefits and advantages such as adjusting vehicle lights based on environmental conditions. The environmental conditions may include moisture in the air, in which case the systems advantageously adjust features of headlights or taillights to reduce scattering of the generated light by the moisture. The systems may further provide the benefit of adjusting the high beams between a high-beam mode and a low-beam mode based on an amount of ambient light and based on whether one or more vehicle is approaching the present vehicle from a front end. The systems can also advantageously output a representation of other vehicles on a display of the present vehicle to alert a driver to the presence of the other vehicles in certain low-visibility conditions. The display may advantageously be overlaid on a vehicle windshield to provide an accurate representation of the location, relative distance to, and heading of the other vehicle.

The systems may also provide the benefit of generating a laser beam toward a roadway behind the vehicle to alert nearby vehicles to the presence of the present vehicle in certain low visibility conditions (e.g., in fog or in a haboob). The systems may also advantageously adjust interior cabin lights of the vehicle based on an ambient amount of light in the vehicle cabin in order to improve viewing of certain vehicle features in low-light conditions.

An exemplary system includes one or more vehicle sensor such as a moisture sensor, an image sensor, a light sensor, or the like to detect data corresponding to an environmental condition in the environment of the vehicle. The system may also include several vehicle light sources such as headlights, taillights, cabin lights, or the like. The system may further include an electronic control unit (ECU). The ECU may be coupled to the vehicle sensors and to the vehicle lights. The ECU may determine the environmental condition in the environment of the vehicle (e.g., the presence of moisture, fog, rain, debris in the air, an ambient amount of light, or the like) based on data detected by the sensors. The ECU may further adjust various properties or characteristics of light generated by the vehicle light sources based on the determined environmental condition.

Figure 1:
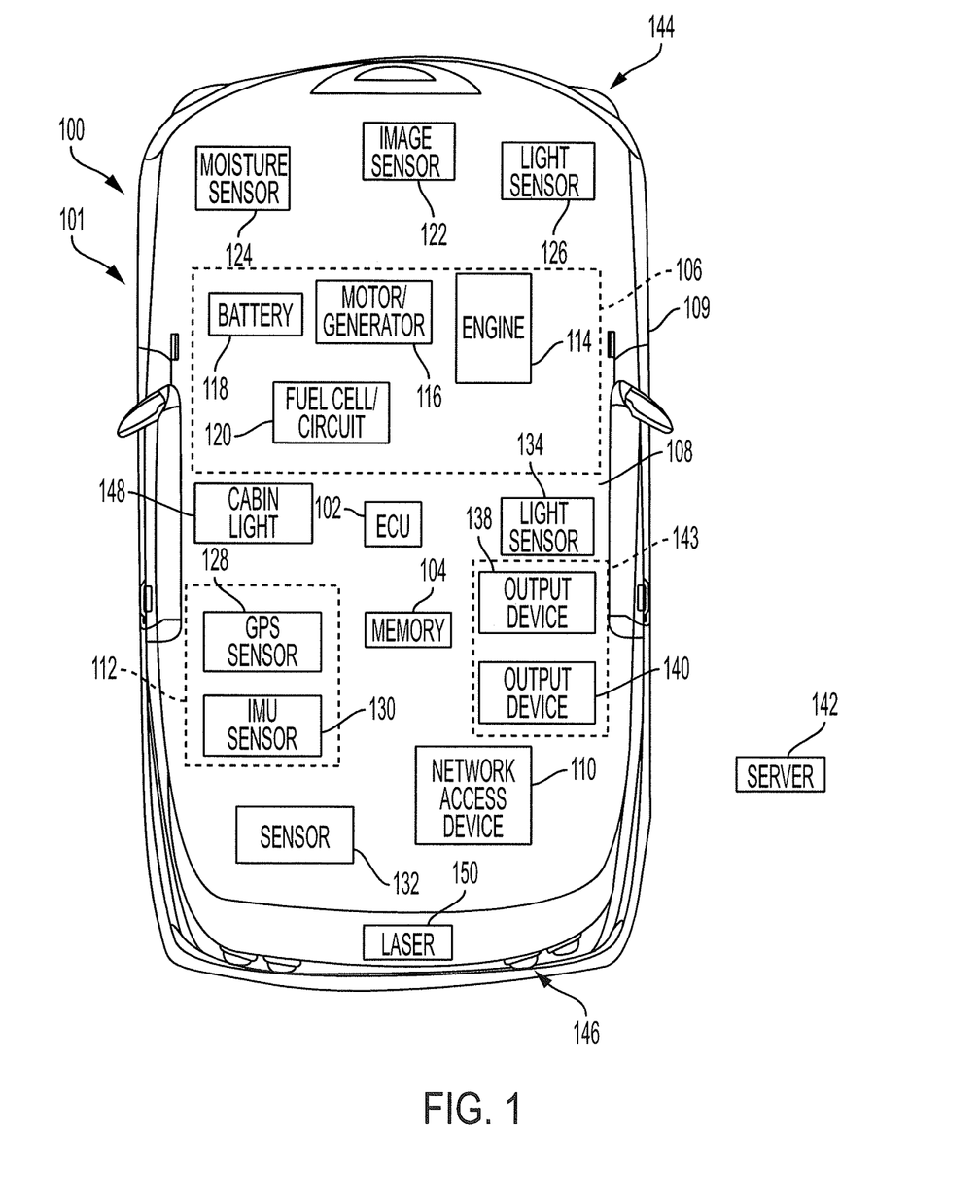
FIG. 1 is a block diagram illustrating a system and a vehicle for improved adaptive vehicle lights according to an embodiment of the present invention.

Turning to FIG. 1, a vehicle 100 may include a system 101 for providing adaptive vehicle lights based on environmental conditions and other factors. The vehicle 100 (or system 101) may include an ECU 102, a memory 104, a power source 106, and a main body 109. The vehicle 100 (or system 101) may further include a network access device 110, headlights 144, taillights 146, one or more cabin light 148, and a laser source 150. The vehicle 100 may further include an image sensor 122, a moisture sensor 124, a light sensor 126, an ambient light sensor 134, and a sensor 132. The vehicle 100 may also include a multimedia unit 143 including an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like.

The main body 109 may define a vehicle cabin 108. The cabin light 148 may be located in the vehicle cabin 108 and may illuminate a portion of the vehicle cabin 108. For example, the cabin light 148 may illuminate the vehicle cabin 108 generally, or may illuminate a specific element (such as a display or instrument panel) within the vehicle cabin 108. The ambient light sensor 134 may be located in the vehicle cabin 108 or in a position in which it may detect an amount of ambient light within the vehicle cabin 108.

The headlights 144 may be located at or near a front of the main body 109 and may illuminate an area in a forward direction relative to the main body 109. The taillights 146 may be located at or near a rear end of the main body 109 and may generate light to increase visibility of the main body 109 during low-light conditions. The laser source 150 may be located at or near a rear end of the main body 109 and may generate a laser beam to be directed downward (i.e., towards a roadway) to further alert other vehicles to the presence of the main body 109.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store instructions usable by the ECU 102 to drive autonomously, may store data indicating actions to be taken by the ECU during various environmental conditions, or the like.

The power source 106 may include any one or more of an engine 114, a motor-generator 116, a battery 118, or a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The moisture sensor 124 may be designed to detect an ambient amount of moisture in the environment of the main body 109. For example, the moisture sensor 124 may detect data usable by the ECU 102 to determine the presence of rain, fog, snow, sleet, or humidity in the environment of the main body 109. In that regard, the ECU 102 may determine a weather condition based on the data detected by the moisture sensor 124.

The light sensor 126 (e.g., photoelectric device, or photo sensor) may detect an ambient amount of light in the environment of the main body 109. The ECU 102 may determine the ambient amount of light in the environment of the main body 109 based on the data detected by the light sensor 126. The data detected by the light sensor 126 may distinguish between sunshine, cloudy conditions, dawn or dusk, artificial light (e.g., streetlights), or the like.

The ambient light sensor 134 may detect an amount of ambient light inside the vehicle cabin 108. The ECU may determine the ambient amount of light in the vehicle cabin 108 based on the data detected by the ambient light sensor 134.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user. In that regard, the vehicle user may adjust vehicle settings using the remote device.

The output device 140 may include any output device such as a speaker, a display, a touchscreen, or the like. In some embodiments and as further described below, the output device 140 may include a display overlaid on a vehicle window. The output device 140 may output data to a user of the vehicle such as a warning of a suspicious event. The network access device 110 may likewise be considered an output device as it may transmit output data to the remote device, where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device. For example, the network access device 110 may communicate with at least one of a remote server 142 (such as a cloud server or other central server) or a remote device (such as a mobile telephone, a laptop, a tablet, a desktop computer, a PDA, or the like).

The network access device 110 may receive various information from the remote server 142 usable to control the various lights (e.g., the headlights 144, the taillights 146, and the cabin light 148). For example, the network access device 110 may receive weather information (e.g., sunrise and sunset times, moonrise and moonset times, the presence of rain, fog, smog, or the like). The network access device 110 may further receive ambient light information (such as the location and brightness of streetlights and other artificial light) from the remote server 142. The network access device 110 may also receive geo-fence information from the remote server 142. For example, the geo-fence information may include a location or locations in which headlight 144 high beams are recommended or prohibited, a location or locations in which daytime running lights are required, or the like.

The ECU 102 may control the operation of the vehicle lights (e.g., the headlights 144, the taillights 146, the cabin light 148, and the laser source 150) based on the data detected by the various sensors (e.g., the image sensor 122, the moisture sensor 124, the light sensor 126, the ambient light sensor 134, the location sensor 112, and the sensor 132) and data received by the network access device 110. For example, ECU 102 may determine that the headlights 144 are operating in a high-beam mode, may determine that an oncoming vehicle is approaching from a front end of the main body 109 based on the data from the image sensor 122, and may determine to switch the headlights 144 to a low-beam mode based on this information.

As another example, the ECU 102 may determine that fog is present in the environment of the main body 109 (e.g. based on data detected by one or more of the moisture sensor 124 or the image sensor 122, or based on data received by the network access device 110). The ECU 102 may adjust the operation of the headlights 144 based on this information to increase illumination of the environment by the headlights 144. For example, the ECU 102 may control the headlights 144 to be directed downward (i.e., towards a roadway) or may control electrical properties of the headlights 144 to reduce light scattering based on the presence of the fog. The ECU 102 may also or instead control the brightness, orientation, or electrical properties of the taillights 146 to increase visibility of the taillights 146 by a following vehicle, or may control the laser source 150 to direct the laser towards the roadway to alert any following vehicle to the presence of the main body 109.

Figure 2A:
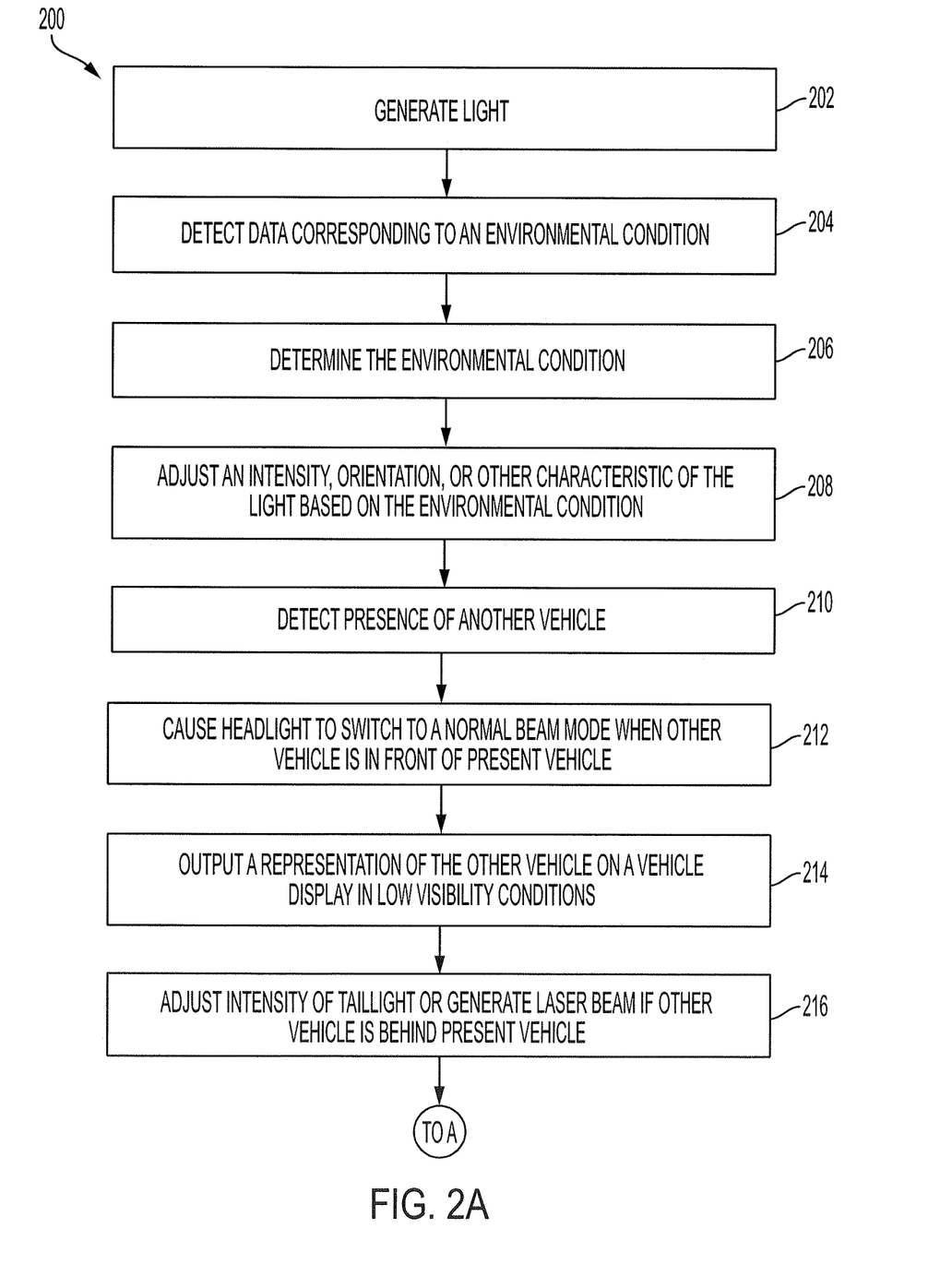
FIGS. 2A and 2B are flowcharts illustrating a method for improved adaptive vehicle lights according to an embodiment of the present invention.
Figure 2B:
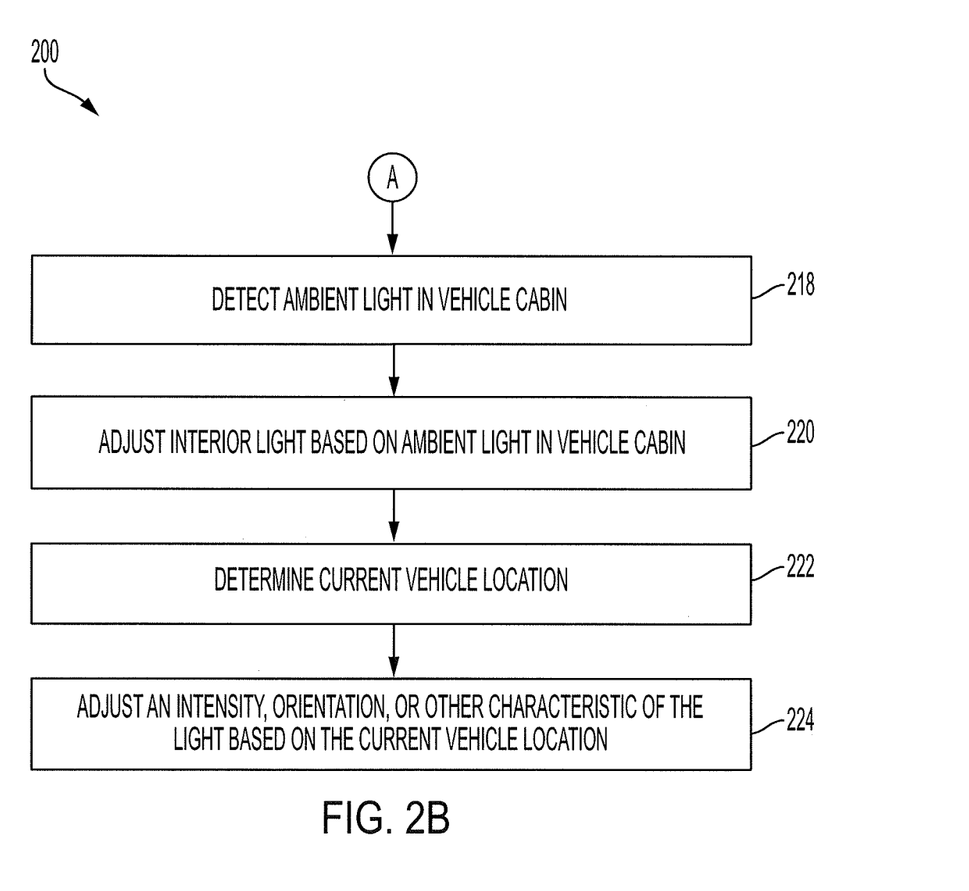

Referring now to FIGS. 2A and 2B, a method 200 for adaptively controlling various lights of a vehicle is shown. The method 200 may be performed by components of a vehicle similar to the vehicle 100 of FIG. 1. The method 200 may begin in block 202 where one or more light source of the vehicle may generate light. The light source may include headlights, taillights, cabin lights, a laser source, or the like.

In block 204, one or more sensor of the vehicle may detect data corresponding to an environmental condition, or a network access device of the vehicle may receive data corresponding to the environmental conditions. The environmental condition may include a weather condition, an amount of ambient light in the environment of the vehicle or within a vehicle cabin, the presence and relative location of another vehicle, geo-fence information, or the like. For example, a camera may detect fog, rain, or snow in the environment, or a moisture sensor may detect the presence of moisture that indicates the presence of rain or fog. As another example, a camera may detect the reflection of light from one or more light source of the vehicle. The camera may be capable of detecting a direction of the reflected light, indicating whether the light is reflecting from moisture above a road (e.g., falling rain or suspended moisture in the form of fog), or whether the light is reflecting from moisture on a roadway. An ECU of the vehicle may be capable of determining the type of moisture as well as whether the reflection is occurring from moisture located on the roadway or moisture above the roadway.

In block 206, an ECU of the vehicle may determine one or more environmental condition based on the data detected in block 204. For example, the ECU may determine that fog is present in the environment of the vehicle based on data detected by one or more image sensor, one or more moisture sensor, or the like. As another example, the ECU may determine an amount of ambient light inside the vehicle cabin or in the environment of the vehicle based on one or more light sensor. As yet another example, the ECU may determine the presence, relative location, and heading of another vehicle based on data detected by an image sensor. As yet another example, the ECU may determine that the vehicle is entering a geo-fence area in which daytime headlights are required by law.

In block 208, the ECU may adjust an intensity, orientation, or other characteristic of the generated light based on the environmental condition. For example, if the environmental condition includes moisture in the environment of the vehicle, such moisture may scatter any light generated by the headlights or taillights. In that regard, the ECU may control the characteristics of the headlights or taillights to reduce such scattering and to better illuminate the environment of the vehicle. The ECU may take such actions as mechanically adjusting the orientation of the headlights or taillights to direct the light farther downward (i.e., towards a roadway and closer to the vehicle). The ECU may also or instead initiate operation of fog lights. The ECU may also or instead reduce the amount of light generated by the headlights or taillights in order to reduce light reflected back into eyes of a driver. The ECU may also or instead adjust electrical properties of the light generated by the headlights or taillights in order to reduce scattering. The ECU may also or instead adjust a color temperature (e.g., color of light) of the headlights or taillights to increase visibility.

As another example, the environmental condition may include an amount of ambient light in the environment of the vehicle. In response to determining that the amount of ambient light is below a darkness threshold (corresponding to a relatively dark environment) then the ECU may control the headlights to switch from a normal-beam mode to a high-beam mode.

As another example, the environmental condition may include moisture on a roadway that is reflecting light from a vehicle light source back into the vehicle cabin. Based on determining this environmental condition, the ECU may adjust a beam of light that is generated by the vehicle light source to reduce or eliminate the reflection of the light back into the vehicle cabin. For example, the ECU may adjust the light source to cause the beam to be narrower in the vertical direction.

In block 210, one or more sensor of the vehicle (such as a light sensor or image sensor) may detect the presence of another vehicle. The ECU may detect an orientation, heading, relative location, and relative distance of the other vehicle based on the detected data.

In block 212, the ECU may control operation of the headlight based on the orientation, heading, relative location, and relative distance of the other vehicle. For example, if the other vehicle is in front of the present vehicle and driving towards the present vehicle then the ECU may control the headlight to switch from a high beam mode to a normal beam mode to reduce light in eyes of the other driver.

In block 214, the ECU may output a representation of the other vehicle on a display in the present vehicle. In some embodiments, this representation may only be displayed in certain conditions (e.g., low visibility conditions). For example, the ECU may output the representation of the other vehicle in conditions such as fog, rain, snow, or other conditions in which visibility of the driver is reduced. In such conditions, various vehicle sensors (e.g., a radar sensor or lidar sensor) may be better able to detect the presence of other vehicles than an image sensor (and human eyes). In that regard, outputting the representation of the other vehicle increases the likelihood of the driver of the vehicle noticing the presence, location, and orientation of the other vehicle.

In block 216, the ECU may adjust an operation or intensity of the taillight or laser source if the other vehicle is behind the present vehicle. In some embodiments, the ECU may only take this action in response to certain low-light or low-visibility conditions (e.g., relatively dark, fog, rain, snow, or the like). The ECU may take this action in response to certain low-light or low-visibility conditions regardless of the presence of other vehicles. For example, in response to identifying a following vehicle in a low-light condition, the ECU may control the taillights to increase in brightness and may control the laser source to generate the laser beam and direct the laser beam towards the roadway behind the present vehicle. As another example, in response to identifying a certain low-light condition, the ECU may control the taillights to increase in brightness and may control the laser source to generate the laser beam.

In some embodiments, the ECU may control the taillights based on the environmental condition. For example, if moisture is present in the environment above a threshold amount (corresponding to an amount of moisture sufficient to scatter a significant percentage of light such as 30 percent, 50 percent, or the like) then the ECU may control the taillights to increase in intensity, change color (to increase visibility), or change electrical properties to reduce scattering.

In block 218, one or more sensor (such as an ambient light sensor) may detect an amount of ambient light in the vehicle cabin, and the ECU may determine the amount of ambient light based on the detected data. In some embodiments, one or more sensor may also or instead detect an amount of light being directed into the vehicle cabin from an external light source (e.g., from streetlights, headlights from other vehicles, or the like). The ECU may determine a total amount of ambient light in the vehicle cabin based on data detected by all sensors associated with the vehicle, by data received by the network access device (e.g. from a server indicating the location of streetlights), or the like.

In block 220, the ECU may adjust the operation or intensity of one or more interior cabin light based on at least one of the determined amount of ambient light in the vehicle cabin or a determined amount of ambient light outside of the vehicle cabin. The interior cabin light may include a light used to illuminate the vehicle cabin generally, a light used to illuminate a specific feature or features in the vehicle cabin (e.g., a light to illuminate a speedometer), or the like. For example, if the ambient amount of light inside or outside of the vehicle cabin is relatively great then the ECU may control the interior cabin light to increase in brightness to increase driver visibility of a specific vehicle feature, or to decrease in brightness due to a high level of ambient light already in the vehicle cabin.

In block 222, a location sensor of the vehicle may detect data corresponding to a current vehicle location. The ECU may determine the current vehicle location based on the detected data. For example, the ECU may determine the vehicle location based on GPS data, IMU data, or the like.

In block 224, the ECU may adjust an intensity, orientation, or other characteristic of light generated by one or more light source of the vehicle based on the current vehicle location. For example, the ECU may determine whether the current vehicle location is in a geo-fence area in which specific light operation is desired or required. For example, the ECU may determine that the current vehicle location is in a geo-fence area in which daytime running lights are required. In such a situation, the ECU may control the vehicle headlights to turn on regardless of the environmental condition. As another example, the ECU may determine that a current vehicle location is in a geo-fence area in which it is noted that many streetlights are present. In such a situation, the ECU may control interior cabin lights to increase in intensity to allow a driver to better see features inside the vehicle cabin.

In some embodiments, a user of the vehicle 100 may adjust settings of the vehicle 100 to select how the various features of the adaptive light system operates. For example, a user may select certain conditions in which the representation of the other vehicle (from block 214) is displayed. As another example, a user may select whether one or both of the taillight intensity is increased, or the laser beam is generated (from block 216).

Figure 3:
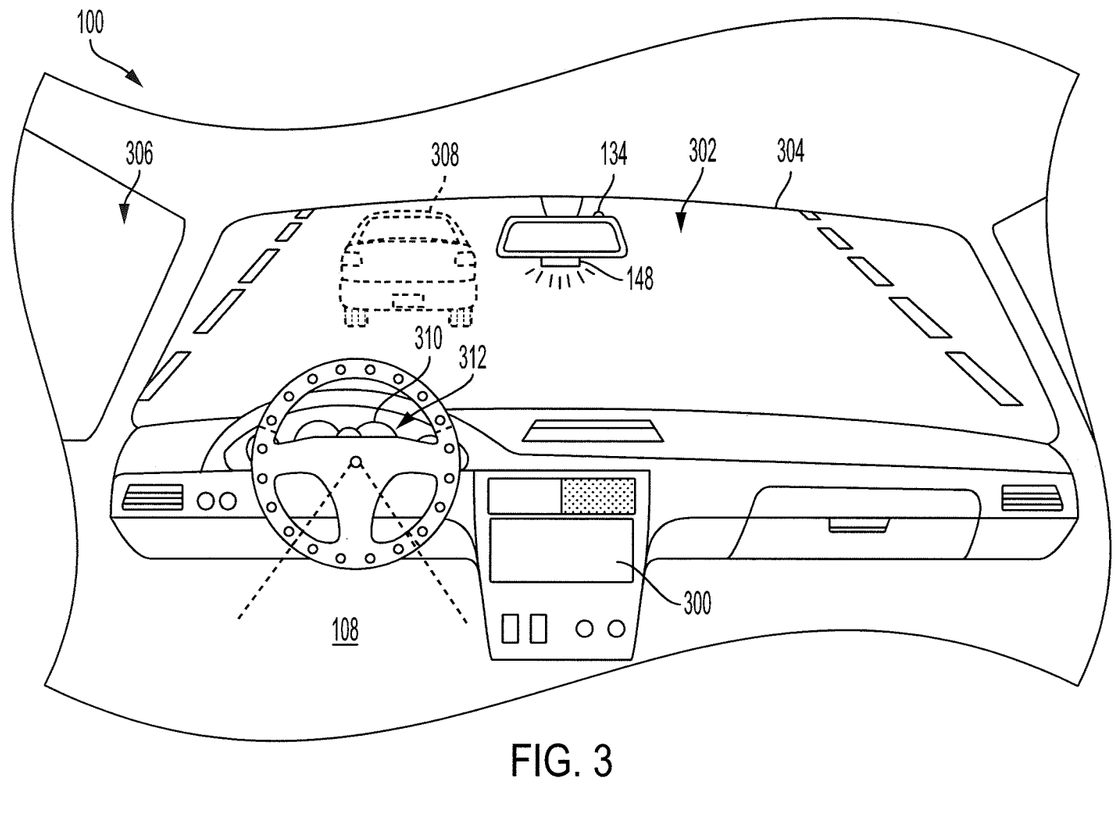
FIG. 3 is a drawing illustrating an exemplary implementation of the method of FIGS. 2A and 2B in a cabin of the vehicle of FIG. 1 according to an embodiment of the present invention.

Referring now to FIG. 3, an exemplary implementation of the method 200 of FIGS. 2A and 2B is shown. In particular, FIG. 3 illustrates an internal view of a portion of the vehicle cabin 108. As shown, the vehicle 100 includes a display 300 along with a windshield 302 and additional side windows 306. The vehicle further includes the ambient light sensor 134 and the cabin light 148, along with another cabin light 310.

The windshield 302 may include an integrated display 304. The integrated display 304 may be overlaid on, or otherwise integrated with, the windshield 302. In that regard, the display 304 may display information in such a manner that the information fails to obstruct the view of a driver (e.g., by being at least partially transparent). Any of the other vehicle windows 306 may include similar displays.

The ECU 102 (shown in FIG. 1) may analyze the various detected data from the sensors and determine present environmental conditions in the environment of the vehicle 100. The ECU 102 may further identify the presence of, heading of, and relative location of other vehicles in the environment of the vehicle 100. In certain situations (such as low visibility conditions, e.g., fog, snow, or the like), the ECU 102 may control the display 304 (or the display 300) to output a visual representation 308 of another vehicle. The visual representation 308 may be positioned on a portion of the windshield 302 that corresponds to the relative location of the other vehicle. Likewise, the visual representation 308 may be sized to illustrate the relative distance to the other vehicle (e.g., the visual representation 308 may be increased in size as the other vehicle becomes closer to the present vehicle 100). In addition, the visual representation 308 may illustrate a current heading of the other vehicle. In that regard, the visual representation 308 may be located such that a driver can identify a relative location and a heading of the other vehicle on the roadway.

The ambient light sensor 134 may detect data corresponding to an amount of ambient light inside of the vehicle cabin 108. The cabin light 148 may generate light to generally illuminate the vehicle cabin 108. The cabin lights 310 may be used to illuminate an instrument panel 312 in the vehicle cabin 108 and may thus be referred to as a backlight 310. The ECU 102 may control the light generated by the cabin light 148 and the backlight 310 based on the detected ambient light inside of the vehicle cabin 108. For example, if the detected ambient light is relatively bright then the ECU 102 may increase the brightness of the backlight 310 to make the instrument panel 312 more visible.

Similarly, the ECU 102 may increase or decrease the brightness of the cabin light 148, depending on user preferences or ECU 102 programming. For example, it may be desirable for the cabin light 148 to be less bright when the vehicle cabin 108 is already illuminated because sufficient light may be present in the vehicle cabin 108 for a driver to see. Alternatively, it may be desirable for the cabin light 148 to be brighter when the vehicle cabin 108 is already illuminated in order to better illuminate certain areas within the vehicle cabin 108.

Figure 4:
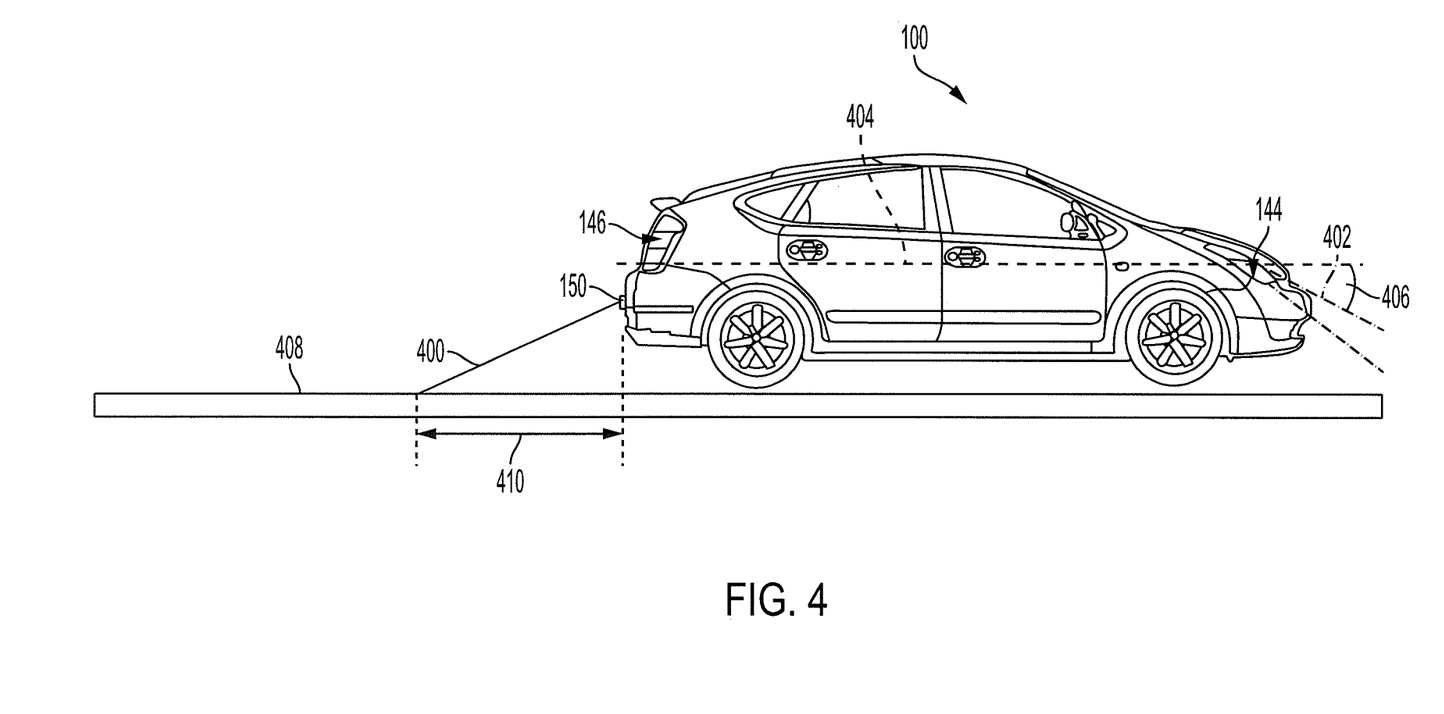
FIG. 4 is a drawing illustrating an exemplary implementation of the method of FIGS. 2A and 2B by the vehicle of FIG. 1 according to an embodiment of the present invention.

Referring now to FIG. 4, another exemplary implementation of the method 200 of FIGS. 2A and 2B is shown. As shown, the vehicle 100 includes the headlights 144, the taillights 146, and the laser source 150. In certain conditions (e.g., a sufficient amount of moisture in the environment of the vehicle) the ECU 102 (shown in FIG. 1) may increase a brightness of the taillights 146. Additionally, the ECU 102 may control the laser source 150 to generate a laser beam 400 and direct the laser beam 400 towards a roadway 408. In some embodiments, the laser beam 400 may be directed to a portion of the roadway 408 that is a specified distance 410 from a rear end of the vehicle 100. The distance 410 may be selected to reduce the likelihood of the laser beam 400 reaching a vehicle cabin of a following vehicle. For example, the distance 410 may be 3 feet, 5 feet, 10 feet, or the like (0.91 meters, 1.5 meters, 3 meters, or the like).

In certain conditions (e.g., a sufficient amount of moisture in the environment of the vehicle 100, or the presence of debris in the air around the vehicle 100 such as during a haboob), the ECU 102 may adjust the operation of the headlights 144. For example, the ECU 102 may adjust electrical properties of the headlights 144 to reduce scattering of the light 402 generated by the headlights 144. Additionally, the ECU 102 may change a color of the light 402 generated by the headlights 144. Also, the ECU 102 may aim the headlights 144 farther downward (i.e., by increasing an angle 406 between a longitudinal axis 404 of the vehicle 100 and the light 402) to reduce scattering.

Figure 5:
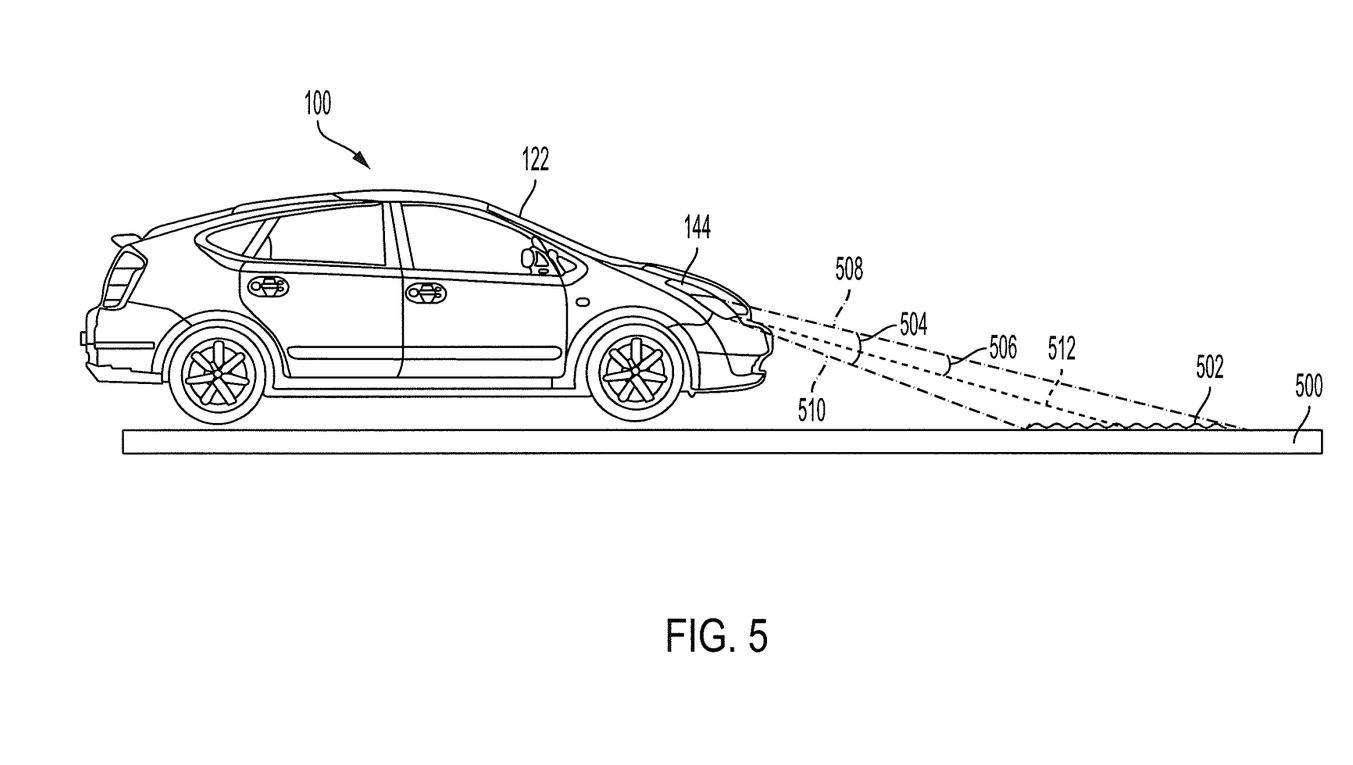
FIG. 5 is a drawing illustrating an exemplary implementation of the method of FIGS. 2A and 2B by the vehicle of FIG. 1 according to an embodiment of the present invention.

Turning to FIG. 5, another exemplary implementation of the method 200 of FIGS. 2A and 2B is shown. The image sensor 122 of the vehicle 100 may be located towards a front of the vehicle 100 and may be designed to detect image data corresponding to a roadway 500. The moisture 502 may be present on the roadway 500 and may reflect light from the headlights 144 back towards a vehicle cabin where it may affect vision of a driver.

The headlights 144 may transmit a light beam having a top edge 508 and a bottom edge 510 such that the light beam extends at an angle 504. The ECU (not shown) of the vehicle 100 may determine that light from towards the bottom edge 510 is the light that is reflecting into the vehicle cabin based on the detected image data. In that regard, the ECU may adjust the beam of light generated by the headlights 144 by, for example, reforming the beam to have a bottom edge 512 that is higher than the bottom edge 510. That is, the ECU may cause the headlights 144 to generate light having a narrower beam in a vertical direction (i.e., the reformed light beam may form an angle 506 which is less than the angle 504). In some embodiments, the ECU may cause the top edge 508 of the light beam to remain the same to reduce the likelihood of light from the headlights 144 affecting vision of oncoming vehicles.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adaptive lights for use in a vehicle, the system comprising:
   a headlight configured to generate light to be at least partially directed away from the vehicle to illuminate a portion of an environment of the vehicle;
   a first sensor configured to detect data corresponding to a weather condition in the environment of the vehicle;
   a second sensor configured to detect a presence of a second vehicle in a vicinity of the vehicle and a relative distance of the second vehicle to the vehicle;
   a display located in a vehicle cabin and configured to display information; and
   an electronic control unit (ECU) coupled to the headlight, the first sensor, the display, and the second sensor and configured to determine the weather condition based on the detected data, to adjust an intensity or an orientation of the light generated by the headlight based on the weather condition, to adjust a beam width of the light as it is output by the headlight to be at least one of narrower or broader in a vertical direction based on the weather condition, determine a low visibility condition when the weather condition reduces visibility in the environment of the vehicle, and control the display to output a representation of the second vehicle when the low visibility condition is determined, the representation of the second vehicle changing in size based on the relative distance of the second vehicle to the vehicle.

2. The system of claim 1 wherein:
   the headlight is further configured to operate in a normal beam mode and a high beam mode in which the light is brighter than in the normal beam mode;
   the ECU is further configured to cause the headlight to switch from the high beam mode to the normal beam mode in response to the second sensor detecting the second vehicle approaching the vehicle from a forward direction relative to the vehicle.

3. The system of claim 1 further comprising:
   an interior light located in the vehicle cabin, configured to illuminate at least one of a meter or a gauge inside of the vehicle cabin, and having at least an off-setting in which the interior light generates no light, a low setting in which the interior light generates a first amount of light, and a high setting in which the interior light generates a second amount of light that is greater than the first amount of light; and
   an ambient light sensor located in the vehicle cabin and configured to detect an ambient amount of light in the vehicle cabin,
   wherein the ECU is further configured to adjust the interior light between the off setting, the low setting, and the high setting based on the ambient amount of light in the vehicle cabin.

4. The system of claim 1 wherein the weather condition includes at least one of fog, rain, or snow and the ECU is further configured to adjust the orientation of the headlight to increase an angle between the light generated by the headlight and a longitudinal axis of the vehicle in response to detection of the at least one of the fog, the rain, or the snow.

5. The system of claim 1 wherein the ECU is further configured to adjust at least one of a color temperature of the light generated by the headlight or electrical properties of the light generated by the headlight to reduce scattering of the light based on the weather condition.

6. The system of claim 1 further comprising a taillight configured to generate light to be at least partially directed away from the vehicle to notify following vehicles of the presence of the vehicle, wherein the ECU is further configured to increase an intensity of the taillight based on the weather condition.

7. The system of claim 1 further comprising a windshield, wherein the display is located on the windshield such that the representation of the second vehicle is overlaid on the windshield to illustrate a location and a current heading of the second vehicle relative to the vehicle.

8. The system of claim 1 further comprising at least one of a light sensor to detect an amount of refraction of the light from the headlight, a moisture sensor configured to detect moisture in the environment of the vehicle, or a camera configured to detect image data in the environment of the vehicle.

9. The system of claim 1 further comprising a location sensor configured to detect a current location of the vehicle, wherein the ECU is further configured to adjust at least one of the intensity or the orientation of the light generated by the headlight based on the current location of the vehicle.

10. A system for adaptive lights for use in a vehicle, the system comprising:
    a headlight configured to generate light to be at least partially directed away from the vehicle to illuminate a portion of an environment of the vehicle;
    a network access device configured to receive information corresponding to a weather condition in the environment of the vehicle and a presence of a second vehicle in a vicinity of the vehicle and a relative distance of the second vehicle to the vehicle;
    a display located in a vehicle cabin and configured to display information; and
    an electronic control unit (ECU) coupled to the headlight, the display, and the network access device and configured to adjust an intensity or an orientation of the light generated by the headlight based on the weather condition, to adjust a beam width of the light as it is output by the headlight to be at least one of narrower or broader in a vertical direction based on the weather condition, determine a low visibility condition when the weather condition reduces visibility in the environment of the vehicle, and control the display to output a representation of the second vehicle when the low visibility condition is determined, the representation of the second vehicle changing in size based on the relative distance of the second vehicle to the vehicle.

11. The system of claim 10 wherein:
the headlight is further configured to operate in a normal beam mode and a high beam mode in which the light is brighter than in the normal beam mode; and
the ECU is further configured to cause the headlight to switch from the high beam mode to the normal beam mode in response to the network access device receiving information that the second vehicle is approaching the vehicle from a forward direction relative to the vehicle.

12. The system of claim 10 further comprising:
an interior light located in the vehicle cabin, configured to illuminate at least one of a meter or a gauge inside of the vehicle cabin, and having at least an off setting in which the interior light generates no light, a low setting in which the interior light generates a first amount of light, and a high setting in which the interior light generates a second amount of light that is greater than the first amount of light; and
an ambient light sensor located in the vehicle cabin and configured to detect an ambient amount of light in the vehicle cabin,
wherein the ECU is further configured to adjust the interior light between the off setting, the low setting, and the high setting based on the ambient amount of light in the vehicle cabin.

13. The system of claim 10 wherein the ECU is further configured to adjust at least one of a color temperature of the light generated by the headlight or electrical properties of the light generated by the headlight to reduce scattering of the light based on the weather condition.

14. A method for adaptive lights for use in a vehicle, the method comprising:
generating, by a headlight, light to be at least partially directed away from the vehicle to illuminate a portion of an environment of the vehicle;
detecting, by a first sensor, data corresponding to a weather condition in the environment of the vehicle;
detecting, by a second sensor, a presence of a second vehicle in a vicinity of the vehicle and a relative distance of the second vehicle to the vehicle;
determining, by an electronic control unit (ECU), the weather condition based on the detected data;
adjusting, by the ECU, an intensity or an orientation of the light generated by the headlight based on the weather condition;
adjusting, by the ECU, a beam width of the light as it is output by the headlight to be at least one of narrower or broader in a vertical direction based on the weather condition;
determining, by the ECU, a low visibility condition when the weather condition reduces visibility in the environment of the vehicle;
controlling, by the ECU, a display located in a vehicle cabin to output a representation of the second vehicle when the low visibility condition is determined; and
changing, by the display, a size of the representation of the second vehicle based on the relative distance of the second vehicle to the vehicle.

15. The method of claim 14 further comprising:
detecting, by the second sensor, that the second vehicle is approaching the vehicle from a forward direction relative to the vehicle; and
causing, by the ECU, the headlight to switch from a high beam mode to a normal beam mode in which the light is dimmer than the high beam mode in response to the second sensor detecting the oncoming vehicle condition.

16. The method of claim 14 further comprising adjusting, by the ECU, at least one of a color temperature of the light generated by the headlight or electrical properties of the light generated by the headlight to reduce scattering of the light based on the weather condition.

17. The method of claim 14 further comprising:
generating, by a taillight, light to be at least partially directed away from the vehicle to notify following vehicles of the presence of the vehicle; and
increasing, by the ECU, an intensity of the taillight based on the weather condition.

* * * * *